United States Patent [19]

Stratton et al.

[11] 4,050,832
[45] Sept. 27, 1977

[54] WINDSHIELD WIPER PIVOT ARM CONNECTION

[75] Inventors: Donald W. Stratton, St. John, Ind.; John P. Moorhead, Palos Verdes, Calif.

[73] Assignee: The Anderson Company, Gary, Ind.

[21] Appl. No.: 740,398

[22] Filed: Nov. 10, 1976

[51] Int. Cl.² ............................................ F16B 21/10
[52] U.S. Cl. ................................ 403/321; 15/250.34
[58] Field of Search ............... 403/316, 317, 321, 328, 403/361, 11, 93; 15/250.34, 250.35

[56] References Cited

U.S. PATENT DOCUMENTS

| | | | |
|---|---|---|---|
| 2,715,238 | 8/1955 | Krohm | 15/250.34 |
| 2,781,540 | 2/1957 | Deibel | 15/250.35 |
| 2,832,982 | 5/1958 | Parkes | 15/250.34 |
| 3,070,389 | 12/1962 | Baur et al. | 403/317 |
| 3,512,205 | 5/1970 | Reister et al. | 15/250.34 |
| 3,600,738 | 8/1971 | Reister et al. | 15/250.34 |
| 3,716,888 | 2/1973 | Reister | 15/250.34 |

FOREIGN PATENT DOCUMENTS

| | | | |
|---|---|---|---|
| 1,210,698 | 2/1966 | Germany | 15/250.34 |

*Primary Examiner*—Wayne L. Shedd
*Attorney, Agent, or Firm*—Wegner, Stellman, McCord, Wiles & Wood

[57] ABSTRACT

The invention relates to a wiper arm assembly having a mounting head with a socket adapted to receive a drive burr of an oscillatable pivot shaft, an arm pivotally connected to the mounting head and spring means connected between the mounting head and the arm so as to press the arm toward a windshield. A latch is provided on the mounting head which, in one position, will render the spring inoperative and will remove a retaining member from alignment with the socket so that the mounting head may be assembled on the drive burr or the mounting head may be removed from said drive burr. After the mounting head is pressed on the drive burr, the latch is moved to a second position that will release the spring means so that the spring means can exert pressure on a wiper blade attached to the outer end of the arm. The latch, in the second position, has the retaining member engaged in overlapping relationship with said socket and said drive burr to hold the mounting head on the drive burr during operation of the wiper arm assembly.

15 Claims, 14 Drawing Figures

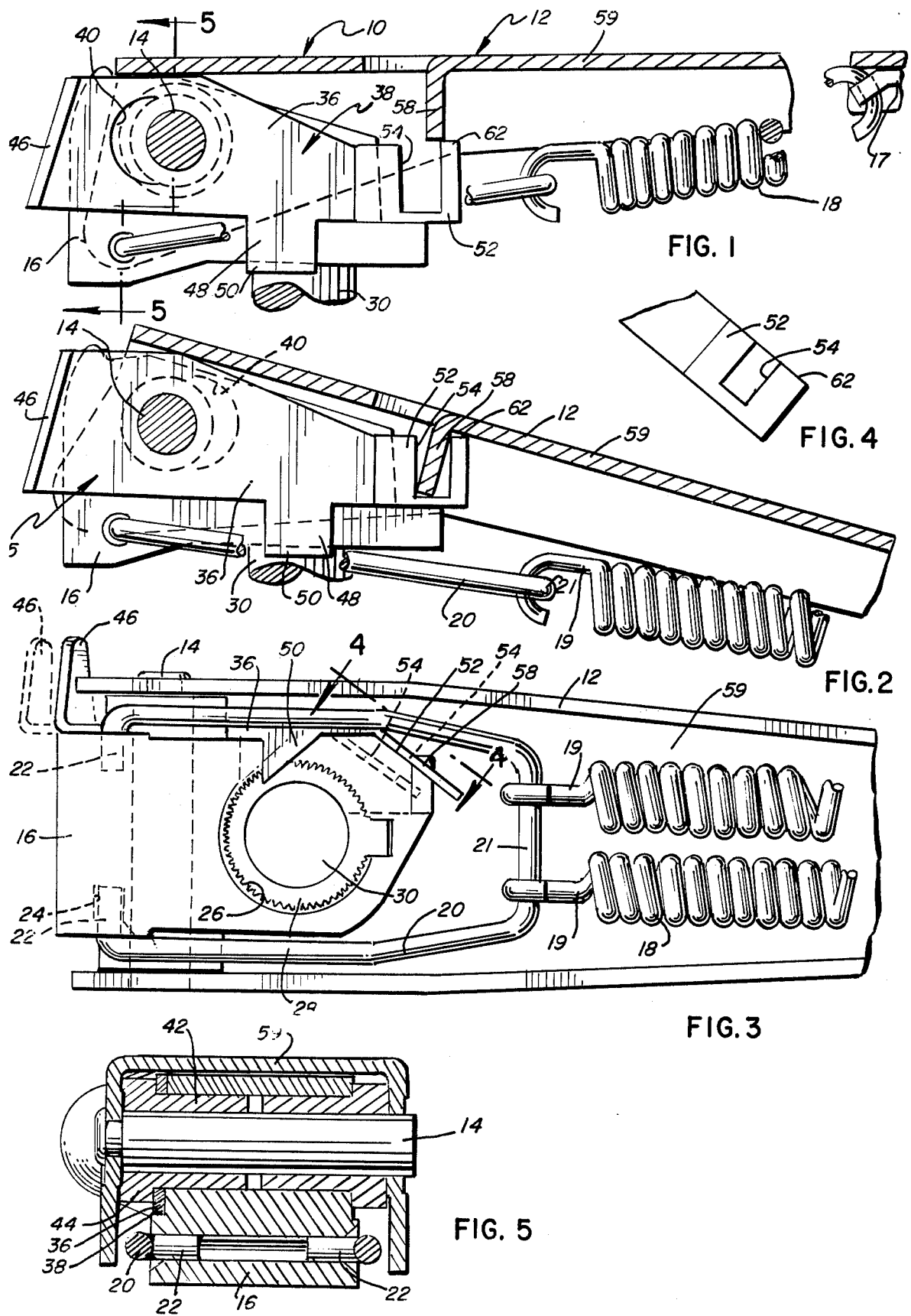

4,050,832

WINDSHIELD WIPER PIVOT ARM CONNECTION

BACKGROUND OF THE INVENTION

1. Field of the Invention

The present invention relates to a windshield wiper arm and, more particularly, to a latching arrangement for connecting a windshield wiper arm to a drive shaft.

2. Description of the Prior Art

In the windshield wiper field, there has been a continuing problem of providing a convenient arrangement for attaching a windshield wiper arm to the drive burr of the drive shaft in such a way as to have a positive lock therebetween and yet make it possible to remove the arm from the drive burr without the need for special tools, and the like. A contributing factor to the problem is the constantly changing designs and demands on windshield wiper arm performance. As windshields become larger or smaller and have increased or decreased curvature, different problems are presented that require different solutions. It is also a well-known fact in automotive design that windshield wiper arms must exert a certain amount of pressure on a wiper blade in order for the wiper blade to be effective in wiping the windshield. The amount of pressure necessary to effect the proper wipe is obtained by the inclusion of one or more springs between the mounting head of the arm and the arm extension. Since the force of the spring pivots the mounting head of the arm toward the arm, the socket in the mounting head is angled in a way as to be substantially impossible to assemble on the driving burr of the drive shaft. In order to assemble the arm to the drive shaft, it is necessary to pivot the mounting head relative to the arm against the tension of the spring so as to align the socket of the mounting head with the drive burr. In many arms, the mounting head is substantially embraced within the inverted U-shaped channel of the arm in such a way that it is almost impossible to get a grip on the mounting head so a to pivot the mounting head relative to the arm against the action of the spring and, at the same time, keep the socket in the mounting head unobstructed for alignment with the drive burr.

Different systems have been used to relieve the tension of the spring during assembly of the mounting head to a drive shaft. For instance, F. A. Krohm U.S. Pat. No. 2,715,728 teaches the use of a screw member to latch the mounting head to the shaft and when the screw and latch are released to a predetermined amount, the spring will pivot the mounting head away from the shaft to disassemble the arm from the shaft.

Most recently, a patent, such a the W. C. Reister et al U.S. Pat. No. 3,512,205, has issued showing a latch activated from the side of the wiper arm which latch holds the spring inactive while the mounting head is aligned with and seated on the drive burr. The Reister et al. latch operates from the side of the arm requiring a motion transverse to the longitudinal axis of the arm and has the latch engaging with the side wall of the arm to hold the spring inactive during assembly of the arm to the drive burr. Systems of this type have disadvantages in that they must be activated at the side of the arm and a twisting force is placed on the channel of the arm when the latch is being used to relieve the tension between the arm and the mounting head.

SUMMARY OF THE INVENTION

A longitudinally slidable latch arrangement is provided which moves along or parallel to the longitudinal axis of the arm and has a retaining member which engages with a portion of the back of the channel of the wiper arm to relieve the tension between the arm and the mounting head. The latch also has a retaining means which is adapted to be positioned in overlapping relationship with the socket in the mounting head and the drive burr on the drive shaft for locking the arm on the shaft. In one position of the latch, the arm is locked relative to the mounting head so that the mounting head can be readily assembled with the drive burr. In the other position of the latch, the arm is free to pivot relative to the mounting head and a retaining means on the latch seats under the overhang of the drive burr to lock the arm to the shaft. The blocking means of the latch is located in such a way as to eliminate twisting between the arm and the mounting head when the loading between the mounting head and the arm is blocked by the latch. The longitudinal sliding movement of the latch is activated from the top or from the rear in such a way as to be readily accessible and easily actuatable without requiring special tools or special instructions therefor.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 shows an elevational view, partially broken away and in section, of a windshield wiper arm having an improved latch arrangement;

FIG. 2 is an elevational view, similar to FIG. 1, with the latch in another position;

FIG. 3 is a bottom view of the arm of FIG. 1 with the arm in the position of FIG. 2 shown in phantom;

FIG. 4 is a cross-sectional view taken along the line 4—4 of FIG. 3;

FIG. 5 is a cross-sectional view taken along the lines 5—5 of FIG. 1;

DESCRIPTION OF THE PREFERRED EMBODIMENT

Figure 6:
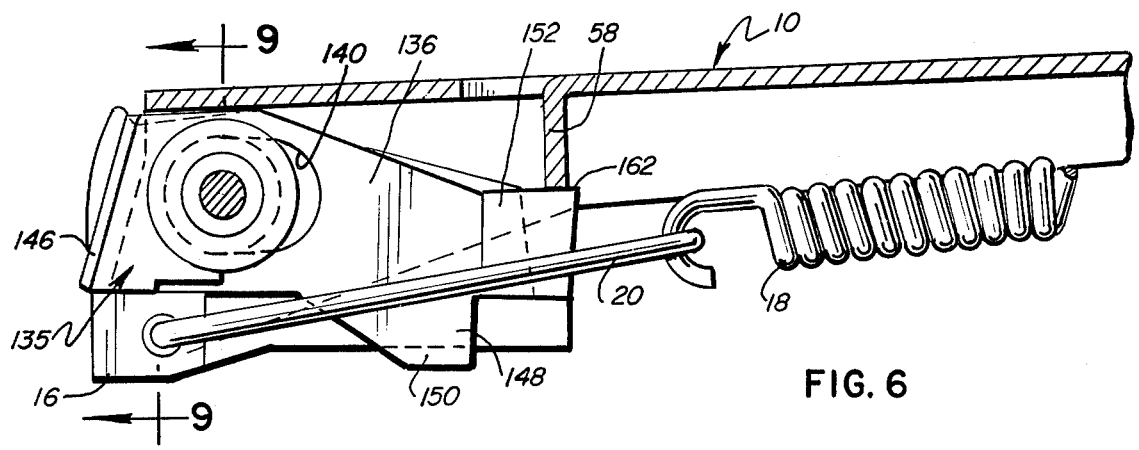
FIG. 6 is a modified form of the invention shown in elevation with parts broken away and with the latch in a blocking position.

One preferred form of the invention is shown in FIGS. 1 through 5 which illustrate a wiper arm assembly 10 which is comprised of a channel-shaped member 12 pivotally mounted by a transverse pin 14 to a mounting head 16. As is well-known in the windshield wiper field, the U-shaped channel member 12 has an arm extension 17 secured thereto, the outer end of which is connected to a windshield wiper blade. To urge the windshield wiper blade toward the surface of a windshield, one or more springs 18 are provided between the arm extension 17 of the arm and the mounting head 16. In the present embodiment, a U-shaped bale 20 has inturned ends 22 seated in sockets 24 in the mounting head 16 with the one end 19 of each spring 18 being connected to the crossbar 21 of the bale 20. For the purposes of this disclosure, reference will be made to the springs 18 being connected to the channel portion 12 of the arm 10 or to the arm extension 17, it being understood that the outer ends of the springs 18 could be connected to the channel 12 or could be connected to the arm extension 17 without in any way affecting the invention.

The modification shown in FIGS. 1 through 5 has the springs 18 connected to the mounting head 16 along the axis of the ends 22 of the bale 20 rearward of the axis of the socket 26 in which the drive burr 28 on the end of a drive shaft 30 seats. The structure described to this point is a conventional commercially available windshield wiper arm assembly.

A latch 35 is provided on the mounting head 16 for retaining the arm assembly 10 to the drive burr 28 on the shaft 30. The latch 35 also includes a blocking member which cooperates with the back of the channel portion 12 of the wiper arm 10 for blocking pivotal movement between the arm 10 and the mounting head 16.

More specifically, the latch 35 has a body portion 36 nested in a slot 38 formed in the side of the mounting head 16 and has an elongate opening 40 through which an enlarged cylindrical bushing 42 passes. The bushing 42 encircles the pivot pin 14 and has an enlarged head 44 which bears against the outer surface of the body 36 to retain the body 36, and hence the latch 35, in position in the slot 38 on the mounting head 16. Due to the elongation of the opening 40, it is possible for the body portion 36, and hence the latch 35, to move in a path parallel to the longitudinal axis of the arm 10. A handle or actuator 46 extends transversely from the body portion 36 and is accessible from the rear of the mounting head 16 and wiper arm channel 12.

Extending downwardly from a midportion of the latch 35 is a retaining member 48 which has an inturned triangularly-shaped retaining tang 50 extending transversely from the plane of the retaining member 48 and body portion 36. The retaining member 48 and retaining tang 50 are positioned on the latch 35 in such a way that in the forward position of the latch 35, such as shown in FIGS. 2 and 3, the tang 50 will overlap the socket 26 and the drive burr 28. In the rearward position of the latch 35, such as shown in FIG. 1 and in dotted lines in FIG. 3, the tang 50 of the retaining member 48 will have been shifted rearwardly of the wiper arm 10 and out of alignment with the socket 26 and drive burr 28.

The forward end portion of the body 36 has a blocking member 52 angled with respect to said body 36 and extends forwardly therefrom. The blocking member 52, as can be seen in FIG. 4, has a slot 54 cut therein from the top surface thereof. The slot 54 is of such a size and shape that a tab or projection 58 struck down from the back portion 59 of the channel 12 of the arm 10 will nest therein with the walls of the slot 54 not interferring with the tab or projection 58 throughout the full arc of movement of the arm 10 during normal use of the arm 10 in wiping a windshield. That is, as the wiper arm 10 traverses the surface of a windshield, the spring 18 will hold the blade constantly in contact with the surface of the windshield which will cause the channel portion 12 of the arm 10 to pivot about the pivot pin 14 toward and away from the surface of the windshield depending upon the shape and curvature of the windshield. The tab 58 will be seated in the slot 54 when the tang 50 of the retaining member 48 is in locking position by overlapping the socket 26 and drive burr 28. In this position, the arm 10 is ready for use in wiping a windshield.

The arm 10 can be forcibly pivoted relative to the mounting head 16 so as to raise the tab 58 completely out of the slot 54, whereupon the latch 35 can be moved rearward so that the tab 58 will engage with a top surface 62 of the blocking member 52 upon releasing said arm 10. As can be clearly seen in FIG. 1, the tab 58 bears on the top surface 62 of the blocking member 52 whereupon the relative position of the channel portion 12 of the arm 10 and of the mounting head 16 is fixed so that the socket 26 in the mounting head 16 can be easily aligned with and manipulated onto or removed from the driving burr 28 on the shaft 30. Likewise, with the latch 35 in the rearward position of FIG. 1 and in the phantom position of FIG. 3, the tank 50 on the retaining member 48 is no longer aligned with the socket 26 so that the drive burr 28 is free to be removed from or inserted into the socket 26. Once the mounting head 16 has been assembled on the drive burr 28, the latch 35 can be pushed inward along an axis parallel to the longitudinal axis of the arm 10 so that the tab 58 will align with the slot 54 whereupon the arm extension 17 will pivot clockwise to the position of FIG. 2 wherein the wiper blade on the end of the arm 10 will be spring-urged into contact with the surface of the windshield and, at the same time, the tang 50 will be positioned in overlapping relationship with the socket 26 and drive burr 28 so that the arm 10 cannot be removed from the shaft 30. An alternate way to actuate the latch 35 to lock the arm 10 on the shaft 30 would be to lift the arm 10 slightly with respect to the mounting head 16 whereupon pressure on the handle 46 will move the latch 35 longitudinally of the arm 10 so as to move the tang 50 into latching position and to align the tab 58 with the slot 54. At that point, the arm 10 can be lowered so that a blade on the outer end of the arm 10 will be brought into contact with the surface of the windshield.

Figure 7:
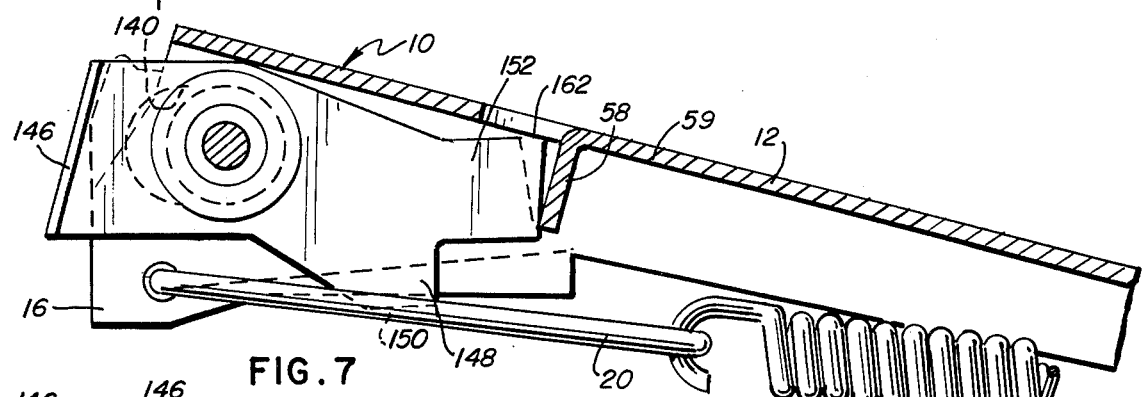
FIG. 7 is an elevational view, similar to FIG. 6, with the latch in the retaining position.
Figure 8:
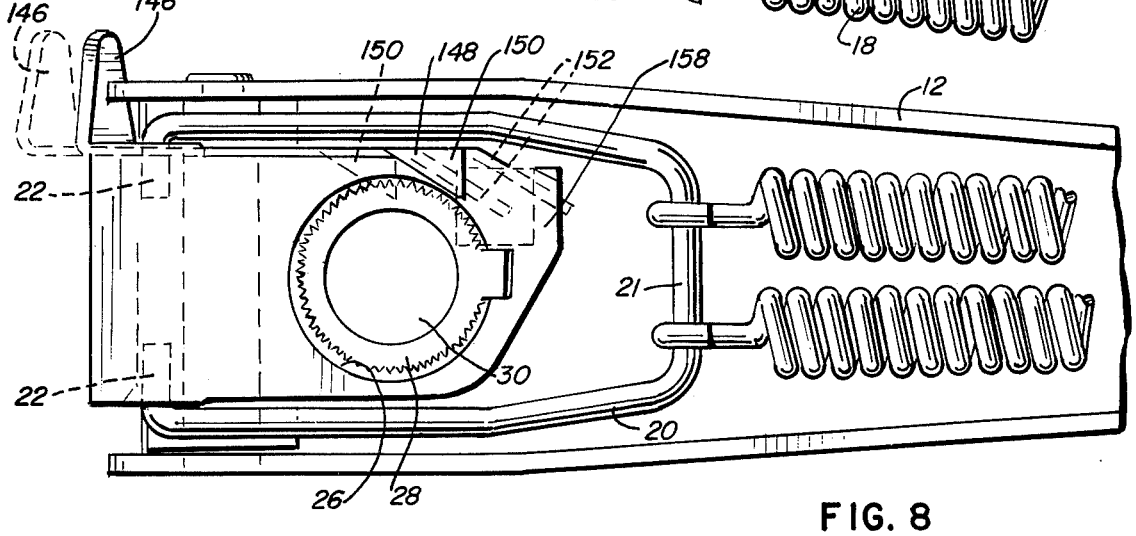
FIG. 8 is a bottom view of the form of the invention shown in FIG. 6.
Figure 9:
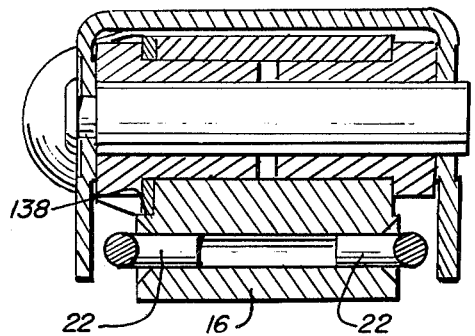
FIG. 9 is a cross-sectional view taken along the lines 9—9 of FIG. 6.
Figure 10:
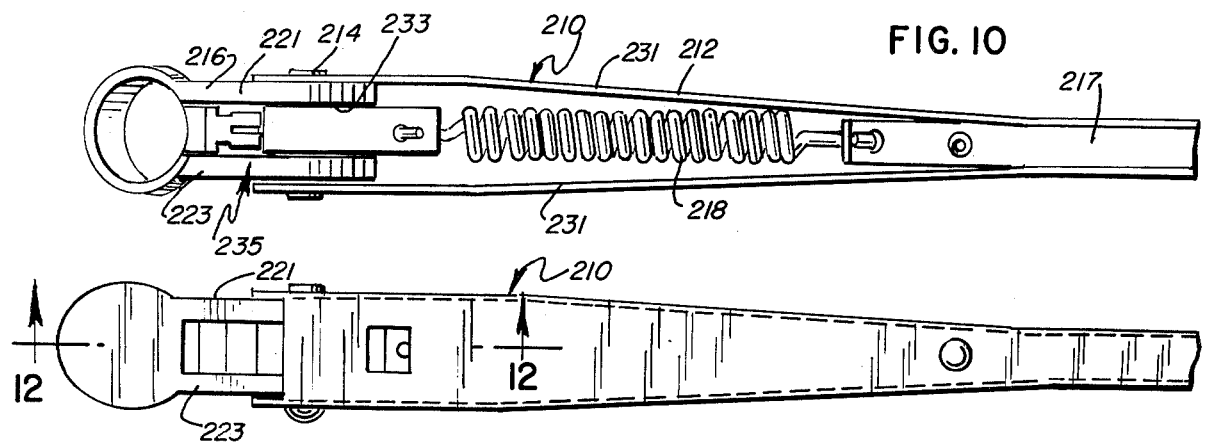
FIG. 10 is a further modified form of my invention showing a single spring construction and is a bottom plan view thereof.
Figure 11:
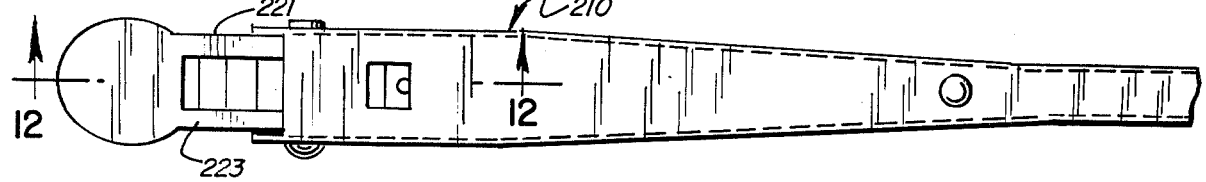
FIG. 11 is a top plan view of the invention of FIG. 10.

The modified form of my invention, shown in FIGS. 6 through 9, is essentially the same type of wiper arm with the improvement being directed to a latch 135. Specifically, the latch 135 has a body portion 136 slidably mounted in a slot 138 in the side of the mounting head 16. The cylindrical bushing 42 surrounding pivot 14 passes through an elongate slot 140 formed in the body 136 and the enlarged head 44 on said bushing 42 engages the outer side of said body 136 to retain said body 136 assembled in said slot 138 in the head 16. The body 136 is free to slide relative to said mounting head 16 in a plane parallel to the longitudinal axis of the arm 10 between the extremes permitted by the elongate slot 140. A handle 146 is provided on the one end portion of the latch 135 and is accessible from the one longitudinal end of the wiper arm 10. The body portion 136 has a downwardly extending retaining member 148 which has an inturned tang 150, which tang 150, as shown in FIG. 8, extends inwardly in a position to be moved into overlapping relationship with respect to socket 26 and drive burr 28 on shaft 30. The outer end portion of the body 136 has an angularly disposed blocking member 152, which blocking member 152, in its rearmost position, as shown in FIG. 7, is clear of and does not interfere with the downturned tab 58 formed on the back wall or top wall 59 of the channel portion 12 of the wiper arm 10. In the forward position of the latch 135 and blocking member 152, as shown in FIG. 6, the tab 58 engages with the top edge 162 of the blocking member 152 so as to prevent pivotal movement between the channel portion 12 and the mounting head 16. As shown in FIG, 6, the latch 135 is in the forward position with the edge 162 of the blocking member 152 engaging the tab 58 so as to hold the channel portion 12 and mounting head 16 in position to make it possible to insert a drive burr 28 in the socket 26 in the mounting head 16. In the position of FIG. 6 with the arm 10 blocking upwardly with respect to the mounting head 16, the latching tang 150 is out of alignment with the socket 26 and drive burr 28. By grasping the handle 146 and pulling the latch 135 rearward, the tab 58 will no longer be supported on the edge 162 of the blocking member 152 and, accordingly, the channel portion 12 of the arm 10 will be pivoted clockwise relative to the mounting head 16. At the same time, the locking tank 150 will be moved into overlapping position with respect to the socket 26 and drive burr 28 so as to lock the arm 10 on the shaft 30.

To remove the arm 10 from the shaft 30, the channel 12 is lifted and the handle 146 of the latch 135 is urged longitudinally of the arm 10 until the blocking member 152 is in position below the tab 58 on the channel 12 whereupon release of the channel 12 will nest the tab 58 on the blocking member 152. At that point, the retaining tang 150 will no longer be aligned with the socket 26 so that the arm 10 can be lifted from the drive burr 28. Thus, it can be readily seen that the modified form of invention, shown in FIGS. 6 through 9, discloses a latch arrangement whereby, in the forward position, the arm extension 17 is blocked in a raised location with respect to the mounting head 16, the spring load is rendered ineffective and the retaining tang 150 is misaligned with the socket 26 in the mounting head 16 so that the arm 10 can be assembled or disassembled from the driving burr 28 of the drive shaft 30. Assuming that the arm 10 has now been assembled on the drive burr 28, a slight lifting force on the arm extension 17 will make it possible to easily move the latch 135 longitudinally along the mounting head 16 so as to latch the mounting head 16 to the drive burr 28 and to permit the arm 10 to pivot freely about the pivot pin 14.

Another modified form of invention is shown in FIGS. 10 through 14 and illustrates a windshield wiper arm assembly 210 having a channel-shaped member 212 pivotally connected by pin 214 to a mounting head 216. A single spring 218 is connected between an arm extension 217 carried by the channel member 212 and a pin 219 extending between a pair of bifurcated arms 221,223 of the mounting head 216. The pin 219 is located below and slightly rearward of the pivot 214 and creates the necessary geometry so that the pressure of the spring 218 will urge a blade mounted on the end of the arm assembly 210 into contact with a surface to be wiped. A back or top wall 229 of the channel member 212 of the arm 210 has a stuck down tab 258 extending into the open space between the side walls 231. Longitudinally slidably mounted in the opening or slot 223 between the bifurcated arms 221, 223 of the mounting head 216 is a latch member 235 which has a body portion 236 positioned in said opening or slot 223. The body portion 236 is slidably mounted on a web 237 extending between said bifurcated arms 221, 223.

A handle or actuator 246 passes through an opening 247 in the body portion 236 and an opening 249 in said web 237 and has spread apart legs 251, 253 with enlargements 255, 257 on the ends of the legs 251, 253 which engage below the web 237 so as to secure the latch 235 on the mounting head 216. The handle or actuator 246 is exposed upwardly from the mounting head 216 and can be moved along the longitudinal axis of the channel member 12 or in a plane parallel to the longitudinal axis of the channel member 12. The body portion 236 has a downwardly extending retaining member 248 with a transversely extending tang 250 projecting therefrom. The tang 250 is adapted in one position to overlap the socket 226 in the mounting head 216 and when a driving burr 228 is seated in said socket 226, the tang 250 will overlap same and hold the mounting head 216 latched on the drive shaft 230.

Figure 12:
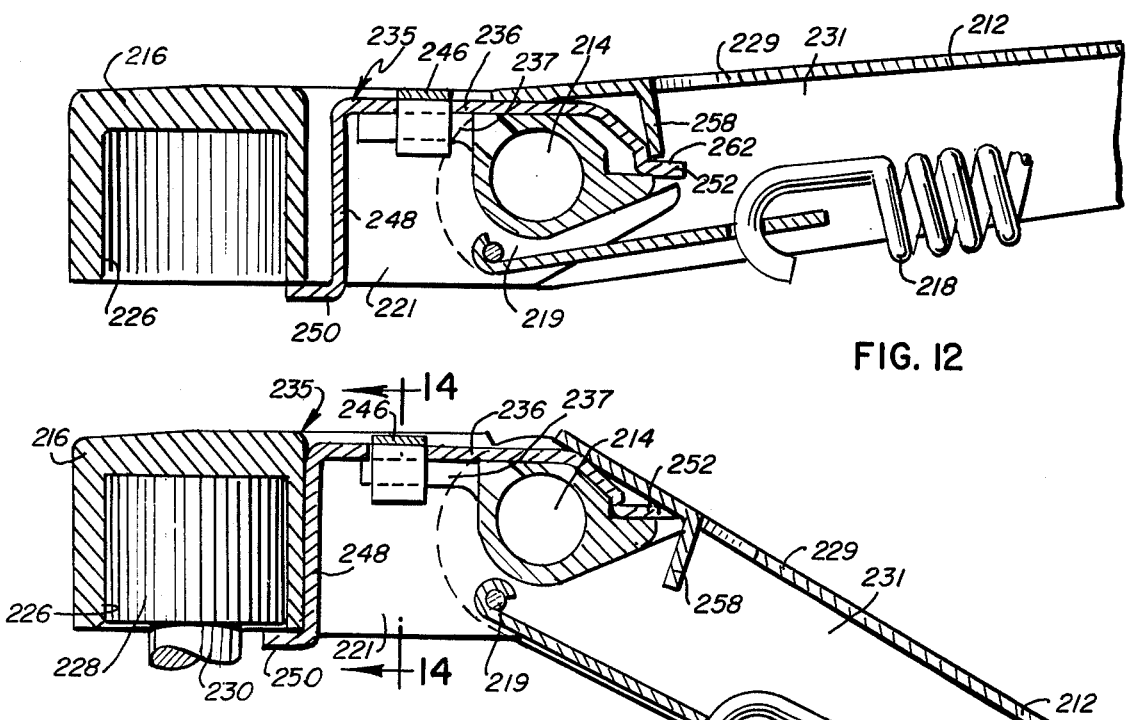
FIG. 12 is an enlarged cross-sectional view taken along the lines 12—12 of FIG. 11.
Figure 13:
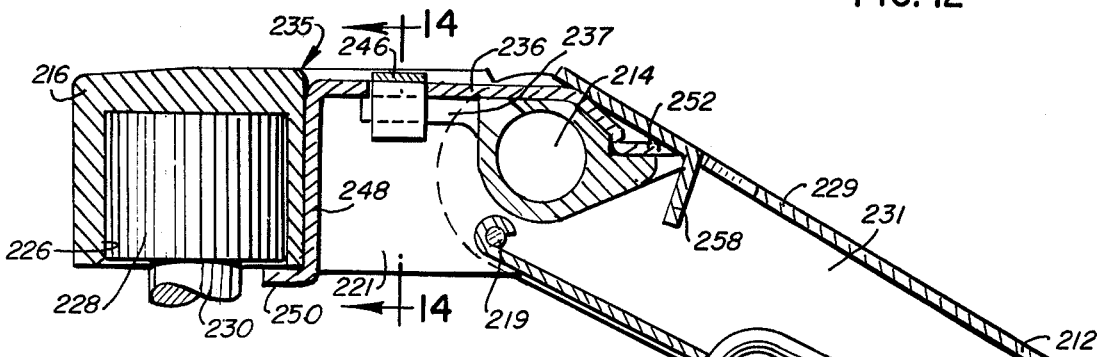
FIG. 13 is a cross-sectional view, similar to FIG. 12, with the latch in a different position.
Figure 14:
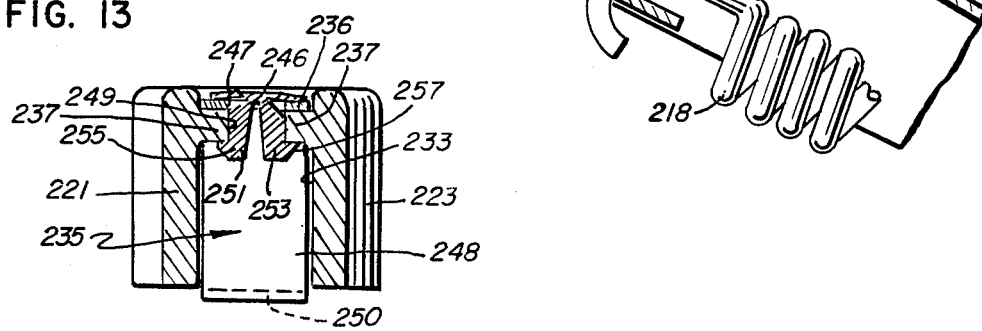
FIG. 14 is a cross-sectional view taken along the lines 14—14 of FIG. 13.

The body 236 of latch 235 also has an outwardly extending blocking member 252 which is slidable on a surface formed on the web 237 between the bifurcated arms 221, 223 of the mounting head 216. The blocking member 252 is movable forward with the latch 235 and, as shown in FIG. 12, is positioned with the tab 258 on the channel 212 engaging surface 262 of the member 252 to hold the spring 218 inactive as far as pivoting the channel 212 relative to the mounting head 216. The blocking member 252 can be positioned rearwardly into an inactive position, such as shown in FIG. 13, whereby the channel 212 is free to pivot in a clockwise direction under the action of the spring 218 urging a wiper blade on the end of the arm assembly 10 into contact with the surface of a windshield. In that position of the latch 235, the retaining tang 250 is in latching position below the driving burr 28 on the drive shaft 30.

In its initial position, the latch 235 will be in the blocking position of FIG. 12 with the blocking member 252 engaging with the tab 258 on the channel 212. The retaining tang 250 will be out of alignment with the socket 226. The mounting head 216 can now be assembled on a drive burr 228 by sliding the drive burr 228 in the socket 226. When the mounting head 216 is in position, a slight lifting pressure is placed on the channel 212 whereupon the handle 246 of the latch 235 can be urged rearwardly so as to move the blocking member 252 out of alignment with the tab 258 on the channel 212 and the retaining tang 250 will be moved into latching position below the drive burr 228 on the drive shaft 230. The wiper system is now ready to operate in its normal manner. To remove the arm from the drive shaft 230, the arm channel 212 is grasped and pivoted in a counterclockwise direction whereupon the handle 246 of the latch 235 is urged longitudinally of the wiper arm assembly 10 to move the blocking member 252 to blocking position below the tab 258 on the back 229 of the channel 212. The retaining tang 250 is now out of alignment with the socket 226 and it is possible to remove the arm assembly 210 from the shaft 230.

The three embodiments of FIGS. 1–5, 6–9 and 10–14 disclose an improved latch arrangement whereby the latch is longitudinally movable along the axis of the wiper arm assembly in one direction to release the arm assembly from the drive burr and simultaneously to block the arm channel or, in a position to remove the tension of the spring between the arm channel and the mounting head. In the other position of the latch, the arm assembly is locked to the drive burr of the drive shaft and there is no interference with the pivotal movement of the arm channel relative to the mounting head.

We claim:

1. A wiper arm assembly comprising a mounting head having a socket and an arm pivotally connected to the mounting head and projecting longitudinally outwardly from the mounting head, spring means connected between said mounting head and said arm for pivoting said arm relative to said mounting head, and a latch slidably mounted on said mounting head, said latch comprising a body portion mounted on said mounting head for sliding movement in a direction parallel to the longitudinal axis of said arm, blocking means carried by said body portion, retaining means carried by said body portion and spaced from said blocking means, and actuator means carried by said body portion, said latch in one position will engage the blocking means with said arm to block said arm relative to said mounting head and will clear the retaining means from interference with the socket, and said latch means in a second position will clear the blocking means from interference with said arm and will overlap said retaining means over said socket.

2. A wiper arm assembly as claimed in claim 1 wherein said actuator means is carried by said body portion and extends outwardly from said mounting head.

3. A wiper arm assembly as claimed in claim 2 wherein said actuator means is a separate handle extending through a top surface of said mounting head.

4. A wiper arm assembly as claimed in claim 2 wherein said actuator means is a handle formed integrally with the body portion and projects rearwardly from said mounting head.

5. A wiper arm assembly as claimed in claim 1 wherein the arm comprises a channel-shaped portion, said tab projects inwardly from the top wall of said channel-shaped portion, and said blocking means has a surface engaged by said tab to hold said arm aligned with said mounting head with said spring ineffective to pivot said arm relative to said mounting head.

6. A wiper arm assembly as claimed in claim 1 wherein said arm includes a channel-shaped portion with said tab projecting inwardly from the top wall of said channel.

7. A wiper arm assembly as claimed in claim 6 wherein said blocking means has a slot formed intermediate the ends of said blocking means with said slot being open at the top, said tab on said channel portion nesting in said slot when said latch is in position to engage the retaining means in overlapping relation to the socket in the mounting means.

8. A wiper arm assembly as claimed in claim 6 wherein said blocking means has an upper edge which is engaged by said tab when said latch is in a position with said retaining means out of alignment with said socket in the mounting means.

9. A wiper arm assembly as claimed in claim 4 wherein said body portion is slidably disposed in a slot formed in the side wall of said mounting head.

10. A wiper arm assembly as claimed in claim 9 wherein said blocking means has an upwardly facing edge adapted to be engaged by said tab when said retaining means is misaligned with said socket in said mounting means.

11. A wiper arm assembly as claimed in claim 10 wherein said blocking means has a slot formed inward from said upwardly facing edge which slot receives said tab when said retaining means is in overlapping relation to the socket in the mounting head.

12. A wiper arm assembly as claimed in claim 6 wherein said retaining means comprises a retaining member having a part extending from said body portion and a tang extending transversely to the plane of said part, said tang being adapted to be positioned in overlapping relationship to said socket in said mounting means.

13. In a wiper arm assembly comprising a mounting head having a socket adapted to receive a drive burr carried by an oscillatable pivot shaft and an arm pivotally connected to the mounting head and projecting longitudinally outwardly from the mounting head, spring means connected between said mounting head and said arm for urging said arm toward a windshield being wiped, in combination with a latch means for alternately locking the arm to said drive burr and blocking said arm relative to the mounting head so that a blade carried thereby is out of contact with the windshield, said latch means comprising a body portion slidably disposed on said mounting head for movement parallel to the longitudinal axis of said arm, blocking means on the forward end of said body portion, retaining means on said body portion spaced from said blocking means, whereby when said latch means is in one position the blocking means will engage with a portion of said arm to hold said arm and blade away from the windshield and said retaining means will be clear of the socket and drive burr, and whereby when said latch means is in a second position the blocking means will be clear of said arm and said retaining means will overlap said socket and said drive burr, and actuator means carried by said body portion and projecting from said arm whereby movement of said actuator means longitudinally of said arm alternately lock said arm on said drive burr and lock said arm away from the windshield.

14. In a wiper arm assembly as claimed in claim 13 wherein said blocking means has an upwardly facing edge, said arm having a channel-shaped portion with a tab extending downwardly therefrom, said tab engaging said upwardly facing edge when said latch is positioned with said retaining means misaligned with said socket in said mounting means.

15. In a wiper arm assembly as claimed in claim 13 wherein said blocking means has a slot formed in said facing edge in which said tab nests when said latch is positioned with said retaining means aligned with said socket in said mounting means.

* * * * *

UNITED STATES PATENT AND TRADEMARK OFFICE
CERTIFICATE OF CORRECTION

PATENT NO. : 4,050,832
DATED : September 27, 1977
INVENTOR(S) : Donald W. Stratton and John P. Moorhead It is certified that error appears in the above-identified patent and that said Letters Patent are hereby corrected as shown below:

Column 5, line 15, change "blocking" to --blocked--.

Column 5, line 64, change "223" to --233--.

Column 5, line 67, change "223" to --233--.

Column 8, line 47, after "arm" insert --will--.

Signed and Sealed this

Fourteenth Day of March 1978

[SEAL]

Attest:

RUTH C. MASON
Attesting Officer

LUTRELLE F. PARKER
Acting Commissioner of Patents and Trademarks